United States Patent [19]
Marshall

[11] 3,860,719
[45] Jan. 14, 1975

[54] ANTAGONISM OF ETHANOL INTOXICATION WITH 2-[(3,4-DICHLOROPHENOXY)METHYL]-2-IMIDAZOLINE

[75] Inventor: Franklin N. Marshall, Midland, Mich.

[73] Assignee: The Dow Chemical Company, Midland, Mich.

[22] Filed: Dec. 21, 1972

[21] Appl. No.: 317,115

[52] U.S. Cl. .............................................. 424/273
[51] Int. Cl............................................. A61k 15/12
[58] Field of Search ..................................... 424/273

[56] References Cited
UNITED STATES PATENTS
3,449,355    6/1969    White ................................ 424/273

*Primary Examiner*—Albert T. Meyers
*Assistant Examiner*—Daren M. Stephens
*Attorney, Agent, or Firm*—Maynard R. Johnson

[57] ABSTRACT

A method useful for combatting ethanol intoxication or ethanol-induced narcosis in mammals comprises internally administering to an animal an effective amount of 2-[(3,4-dichlorophenoxy)methyl]-2-imidazoline or a pharmaceutically-acceptable salt thereof.

6 Claims, No Drawings

ANTAGONISM OF ETHANOL INTOXICATION WITH 2-[(3,4-DICHLOROPHENOXY)METHYL]-2-IMIDAZOLINE

SUMMARY OF THE INVENTION

This invention is concerned with a method and compositions for combatting ethanol intoxication and narcosis in mammals and is particularly directed to a method which comprises administering an imidazoline compound to a mammal in an amount sufficient to antagonize ethanol intoxication and narcosis, the imidazoline compound being selected from 2-[(3,4-dichlorophenoxy)methyl]-2-imidazoline and the pharmaceutically-acceptable salts thereof.

It has been found that 2-[(3,4-dichlorophenoxy)methyl]-2-imidazoline and the pharmaceutically-acceptable salts thereof have the useful property of antagonizing the central nervous system depressant effects of ethanol when administered to animals, and in particular, to mammals intoxicated or narcotized with ethanol. As employed herein, the phrase "pharmaceutically-acceptable salts" refers to non-toxic acid addition salts of the imidazoline compound, the anions of which are relatively innocuous to animals at dosages consistent with good ethanol antagonizing activity so that the beneficial effects of the free base are not vitiated by side effects ascribable to the anions. Pharmaceutically-acceptable salts include those derived from mineral acids such as hydrochloric, hydrobromic, sulfuric and nitric acid and from organic acids such as acetic, lactic, maleic, succinic, fumaric, glutaric, citric, malic and tartaric acids and the like.

The 2-[(3,4-dichlorophenoxy)methyl]-2-imidazoline compound can be prepared by the reaction of the corresponding 3,4-dichlorophenoxy acetic acid or 3,4-dichlorophenoxy acetonitrile with ethylene diamine monotosylate by the procedure disclosed by White, U.S. Pat. No. 3,449,355. The pharmaceutically-acceptable salts are prepared by dissolving the free base compound in an alcohol and adding an excess of an alcoholic solution of an acid such as hydrochloric acid, acetic acid, maleic acid or the like to precipitate the pharmaceutically-acceptable salt. The salt can be separated by filtration and purified by recrystallization.

It is known that 2-[(3,4-dichlorophenoxy)methyl]-2-imidazoline and its pharmaceutically-acceptable salts have central nervous system antidepressant activity in mammals. Many known antidepressant compounds, such as amitryptaline, nortryptaline, imipramine and doxepin, tend to potentiate or exaggerate the central nervous system effects of ethanol, rather than antagonizing ethanol. In contrast, the present imidazoline compound has exhibited striking antagonism of ethanol.

In accordance with the invention, an effective amount of 2-[(3,4-dichlorophenoxy)methyl]-2-imidazoline or a pharmaceutically-acceptable salt thereof is administered internally to a mammal. More specifically the imidazoline compound is administered internally to an animal in a manner effective to introduce an effective ethanol-antagonizing amount of said compound into the blood stream, usually by injection or by oral administration. Ethanol antagonism and alleviation of intoxication or narcosis can be obtained when the compound is administered to a mammal already intoxicated or narcotized with ethanol, for example, as an antidote to ethanol overdosage or over consumption. Antagonism can also be achieved when the compound is administered prior to administration or consumption of ethanol, provided the ethanol is introduced into the animals' system at a time when the remaining blood level of the imidazoline compound is sufficient to achieve an alcohol-antagonizing effect.

The imidazoline compound can be formulated with conventional pharmaceutical carriers in known procedures. The selection of the exact pharmaceutical carrier to be employed in any given circumstance can be carried out by routine and conventional range finding operations to arrive at formulations having the desired characteristics of physical form, ease of administration by a desired route, storage stability, etc.

The amount of the imidazoline compound to be administered to a mammal in particular cases can vary depending upon such factors as the ethanol blood level, degree of intoxication or narcosis to be alleviated, the presence of ethanol in the gastrointestinal tract, the route of administration, the exact effect to be produced, whether or not the free base or a pharmaceutically-accpetable salt of the mixed imidazoline compound is employed, whether or not the compound is employed prophylactically or therapeutically, e.g., as an antidote, and the species, size, weight, age and physical condition of the particular animal being treated. In general, when the animal is semiconscious or unconscious as a result of ethanol narcosis it is preferred to administer the compound at an ethanol antagonizing amount sufficient to bring about a return to consciousness. In such operations, the active compound is preferably introduced into the cardiovascular system of the animal by injection to provide an ethanol-antagonizing concentration thereof in the blood sufficient to alleviate the intoxication and narcosis. In the convenient procedure, the compound is administered by intravenous, intraperitoneal, intramuscular or subcutaneous injection. When the animal is conscious, as in less severe intoxication or prophylactic applications, oral administration is generally more convenient. For prophylactic administration, the compound is preferably administered orally at a time from simultaneously to about two to four hours prior to administration of an intoxicating or narcotizing dosage of ethanol, up to about 6 to 12 hours when sustained release dosage forms are employed. In general, the imidazoline compound can be administered in oral dosages of from about 10 or less to about 40 or more milligrams per kilogram of animal body weight; by intravenous injection at dosages of from about 1 or less to about 20 milligrams per kilogram; or from about 20 milligrams per kilogram; or from about 1 or less to about 40 or more milligrams per kilogram by parenteral routes other than intravenous.

DESCRIPTION OF THE PREFERRED EMBODIMENTS

The following examples illustrate the invention but are not to be construed as limiting the same.

Example 1

Groups of male mice were examined in "activity cages" comprising a circular runway equipped with photoelectric sensors to give quantitative indication of spontaneous motor activity by counting the number of times light beams across the runway were interrupted during a thirty minute period. Separate groups of male mice were administered 2-[(3,4-dichlorophenoxy)methyl]-2-imidazoline hydrochloride in aqueous 0.9% sodium chloride solution, or the aqueous sodium chloride solution containing no test compound. The imidazoline compound and the saline solution check were administered by oral intubation, the test compound being administered at a rate of 40 milligrams per kilogram (mg/kg). The mice were then placed in separate activity cages and counts were recorded for 30 minutes. At the end of this period the mice administered the test compound and one check group of mice are administered ethanol by oral intubation at a rate corresponding to 8 milliliters of 95 percent ethanol per kilogram (ml/kg). A third check group of mice (administered only saline solution) was administered an additional dose of saline solution at this time. The three groups of mice were again placed in separate activity cages and counts were recorded for 30 minute periods during the next succeeding 2 hours. The activity count results for the 30 minute period prior to administration of ethanol indicated that the test compound had no appreciable effect on the spontaneous motor activity. The results indicated a significant decrease in motor activity in the check group of mice administered 8 ml/kg of ethanol, the ratio of counts per 30 minute period for the ethanol treated check mice to the counts per 30 minute period for saline treated check mice being 0.6, 0.5, 0.5 and 0.4 for the four 30-minute periods following administration of ethanol. In contrast, an increase in spontaneous motor activity following administration of ethanol was observed in the mice administered the imidazoline test compound.

Example 2

A group of ten mice was administered 4.75 ml/kg of ethanol by intraperitoneal injection. Administration of this dosage of ethanol was observed to induce complete narcosis, and the duration of narcosis was measured by observing the time the animal remained unconscious following administration of ethanol until the time the animal spontaneously righted itself. The mean sleep time was observed to be about 70 minutes, and the animals were observed to lose their righting reflexes within 10 minutes after administration of ethanol. A second group of mice administered 4.75 ml/kg of ethanol intraperitoneally was administered 10 mg/kg of 2-[(3,4-dichlorophenoxy)methyl]-2-imidazoline hydrochloride by intravenous injection 10 minutes after administration of ethanol, at a time at which all animals showed symptoms of ethanol intoxication and narcosis. In all cases the righting reflex was regained within less than 1 minute after administration of the test compound. The mice were observed for 6 additional hours and none of the mice resumed sleep during this period.

Example 3

In an operation similar to that described in Example 2, a group of mice were administered 10 mg/kg of 2-[(3,4-dichlorophenoxy)methyl]-2-imidazoline hydrochloride by intravenous injection 5 minutes prior to intraperitoneal administration of 4.75 ml/kg of ethanol. Following administration of ethanol the animals were observed to show tremor and were hyperkinetic for about 30 minutes. Observation over a 6 hour period showed that the animals did not sleep, and no unusual activity was noted during this period.

In a similar operation the imidazoline test compound was found to antagonize ethanol intoxication and narcosis when administered at a dosage rate of 5 mg/kg. At this dosage rate about half the mice in the test group lost their righting reflex following administration of ethanol and were observed to sleep for a mean sleeping time of 15 minutes.

The same imidazoline compound can also be employed to counteract narcosis or intoxication induced by methaqualone. For such uses, the compound is administered in the same manner as described above with respect to its use in combatting ethanol narcosis. In an illustrative operation, four groups of mice were narcotized by intraperitoneal injection of methaqualone at a dosage rate of 100 mg/kg. After 10 minutes, the narcotized mice in three of the groups were administered 2-[(3,4-dichlorophenoxy)methyl]-2-imidazoline hydrochloride by intravenous injection at dosage rates of 5, 10 and 15 mg/kg. The fourth group was left untreated as a check. The mean sleeping time in the check group was 138.4 minutes, as compared to mean sleeping times of 82.3, 51.6 and 54.0 minutes observed in the mice administered 5, 10 and 15 mg/kg of imidazoline compound.

In operations carried out with non-narcotized, normal animals, the imidazoline compound has been found to produce no significant effect on spontaneous motor activity at dosages of 10, 21.5 and 46 mg/kg (intraperitoneal injection).

What is claimed is:
1. A method for combatting ethanol intoxication and narcosis in mammals, comprising administering internally to a mammal intoxicated or narcotized with ethanol an amount of an imidazoline compound sufficient to antagonize ethanol intoxication and narcosis, the imidazoline compound being selected from the group consisting of 2-[(3,4-dichlorophenoxy)methyl]-2-imidazoline and a pharmaceutically-acceptable salt thereof.

2. The method of claim 1 wherein the compound is 2-[(3,4-dichlorophenoxy)methyl]-2-imidazoline hydrochloride.

3. The method of claim 1 wherein the compound is administered intravenously to a narcotized mammal.

4. A method for alleviating ethanol intoxication and narcosis in mammals, comprising:
a. administering internally to a mammal subjected to ethanol intoxication or narcosis an amount of an imidazoline compound sufficient to antagonize ethanol intoxication and narcosis, the imidazoline compound being selected from the group consisting of 2-[(3,4-dichlorophenoxy)methyl]-2-imidazoline and a pharmaceutically-acceptable salt thereof; and
b. thereafter administering to the animal an intoxicating or narcotizing amount of ethanol, at a time when the mammal's blood level of imidazoline compound is sufficient to antagonize the ethanol.

5. The method of claim 4 wherein the imidazoline compound is administered orally at a time from simultaneously to about 12 hours prior to administration of ethanol.

6. The method of claim 4 wherein the compound is 2-[(3,4-dichlorophenoxy)methyl]-2-imidazoline hydrochloride.

* * * * *